UNITED STATES PATENT OFFICE.

MELVIN B. CHURCH, OF GRAND RAPIDS, MICHIGAN.

METHOD OF MANUFACTURING GYPSUM COMPOSITION.

SPECIFICATION forming part of Letters Patent No. 497,948, dated May 23, 1893.

Application filed March 26, 1891. Renewed December 14, 1891. Again renewed February 10, 1893. Serial No. 461,808.

(No specimens.)

*To all whom it may concern:*

Be it known that I, MELVIN B. CHURCH, a citizen of the United States of America, residing at Grand Rapids, in the county of Kent and State of Michigan, have invented certain new and useful Improvements in Methods of Manufacturing Gypsum Compositions, of which the following is a specification.

The object of my invention is the production of a compound of calcined gypsum and a retarder, which can be dissolved in cold water and is applicable for use as a mortar and as a substitute for the ordinary mortar made of lime and sand, in the plastering of walls, or the cementing of stone or brick in building walls, or for any of the purposes for which the ordinary lime and sand mortar is used.

Heretofore, as is well known, pulverized calcined gypsum and glue have been mixed together, both ingredients being in a dry pulverized condition. The mixture in this condition is practicable and useful as a wall coating to be applied with a brush, but it must be dissolved in hot water, and this necessity renders it impracticable for use as a substitute for the ordinary lime and sand mortar. The same object has been sought heretofore by reducing the glue to a liquid form, and then mixing it with a small percentage of the calcined gypsum, or any other suitable dry base, drying the mixture and then regrinding it, thus producing a retarding agent containing glue in such form that when mixed with the larger quantity of calcined plaster the dried and ground mixture would act as a retarding agent, for said large quantity; and the said larger quantity, thus mixed with the retarding agent, could be used with cold water and with the addition of sand, as a mortar in plastering walls. One objection to this is the expense of the process, and another objection is, that the dry base used in the retarding agent becomes inert matter, and the retarder is not mixed with the whole of the gypsum direct, but with a part of it which is to act to retard the whole.

There is another method in use, which consists in reducing the glue by heat to a liquid condition in the ordinary manner and then mixing it with the water and calcined plaster and sand, as the mortar is made for the work to which it is applied. This is also an expensive and unreliable process.

The basis of my invention is the discovery that the liquid retarder can be rubbed into the dry pulverized calcined gypsum in a quantity sufficient for the purpose for which it is designed, without wetting the gypsum sufficiently to change its form or to injure its setting qualities and without requiring subsequent drying and pulverizing.

My invention consists in this method or process of combining the liquid retarder with dry calcined gypsum.

In the practical working of my invention I proceed as follows:—The gypsum used in my process is calcined and pulverized in the ordinary manner. I then mix the dry calcined gypsum with liquid glue by evenly feeding the one to the other, and subjecting them as they are thus fed together, to any suitable mixing process. By evenly feeding I mean the uniform application of proportion to proportion so that there is no excess of liquid glue in any part of the gypsum at any time. The glue is first reduced to a liquid form and it is desirable to reduce it to this form with a minimum amount of water. For this purpose I employ the agency of heat together with the admixture of water for reducing the glue to a liquid form. For the purpose of maintaining the glue in a suitable liquid condition as it is fed to the dry plaster, I use as little water as possible. I maintain it in a heated condition to the point of delivery. This may be done in any suitable way, preferably by the application of steam. And this heating of the gypsum destroys any germs that may be in the glue, which is thus preserved by the gypsum. I have found it practicable and convenient to unite the two ingredients by running the gypsum and the liquid glue, in regulated and properly proportioned quantities, into the eye of a mill stone and thus pass it between the stones, and thus rubbing or grinding the materials together. It is not necessary to grind the materials for further reduction of the gypsum. Stones with smooth working faces may be used and of less hardness, with a greater space between them; and thus very little power is required then for grinding.

While I have used the mill consisting of the ordinary grinding disks for this purpose, I do not limit myself to the use of this kind of mill or machinery, as any suitable mechanism for rubbing the ingredients together may be used.

From one-half pound to two pounds of glue are used to one hundred weight of plaster; but the beneficial qualities of the glue are not limited strictly in this proportion, the length of time required for setting being in direct proportion to the amount of glue used in the composition.

The only essential limitation in the amount of glue to be added is this, that so large an amount of water must not be used as to cause the plaster to set or to appear damp as it emerges from the rubbing process. The proportions specified above are applicable and sufficient.

It will be understood from this statement that the liquid glue may not be poured into a large mass of the pulverized calcined gypsum and then stirred therein as in the ordinary method of mixing. In such a process of mixing the mass of gypsum lying immediately about the glue is over saturated, and would set. No saturation of any part of the calcined gypsum must be permitted in my improved process, nor any application of the liquid glue to such an extent that any material part of the gypsum will become damp or wet. The liquid glue must therefore be applied evenly and quickly to every part of the mass, and the only practical way, so far as I am aware, is to apply it to the gypsum by evenly feeding the one to the other, and mixing them in this way. The best way is to grind them together as above described.

After the ingredients have thus been mixed and rubbed together they may be put up in any suitable packages and are in proper condition to be mixed with sand and cold water for making mortar suitable for plastering walls, or laying brick or stone, or for any of the purposes for which ordinary lime and sand mortar is used.

I claim as my invention—

1. The method or process of combining calcined gypsum and a retarder, which consists in evenly feeding together and mixing the gypsum in dry pulverized condition with the retarder in liquid form in substantially the proportions specified whereby a dry composition is produced substantially as set forth.

2. The described method or process of combining calcined gypsum and a retarder which consists in evenly feeding together and mixing the gypsum in a dry pulverized condition with the retarder in a hot liquid condition in substantially the proportions specified, whereby a dry composition is produced substantially as set forth.

In testimony whereof I affix my signature in presence of two witnesses.

MELVIN B. CHURCH.

Witnesses:
HENRY E. COOPER,
MARGARET V. COOPER.